Nov. 5, 1940.  A. D. SIEDLE  2,220,295
CONTINUOUS ABSORPTION REFRIGERATION
Filed July 10, 1937   2 Sheets-Sheet 1

INVENTOR
Arnold D. Siedle
BY
Harry S. Dumas
ATTORNEY

Nov. 5, 1940.     A. D. SIEDLE     2,220,295
CONTINUOUS ABSORPTION REFRIGERATION
Filed July 10, 1937     2 Sheets-Sheet 2
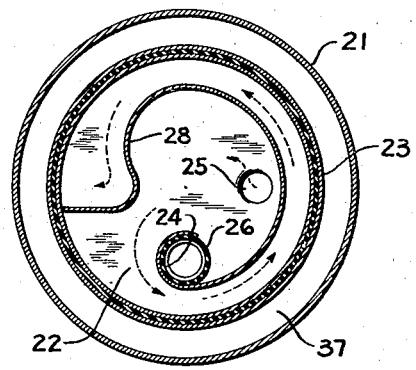
Fig. 3
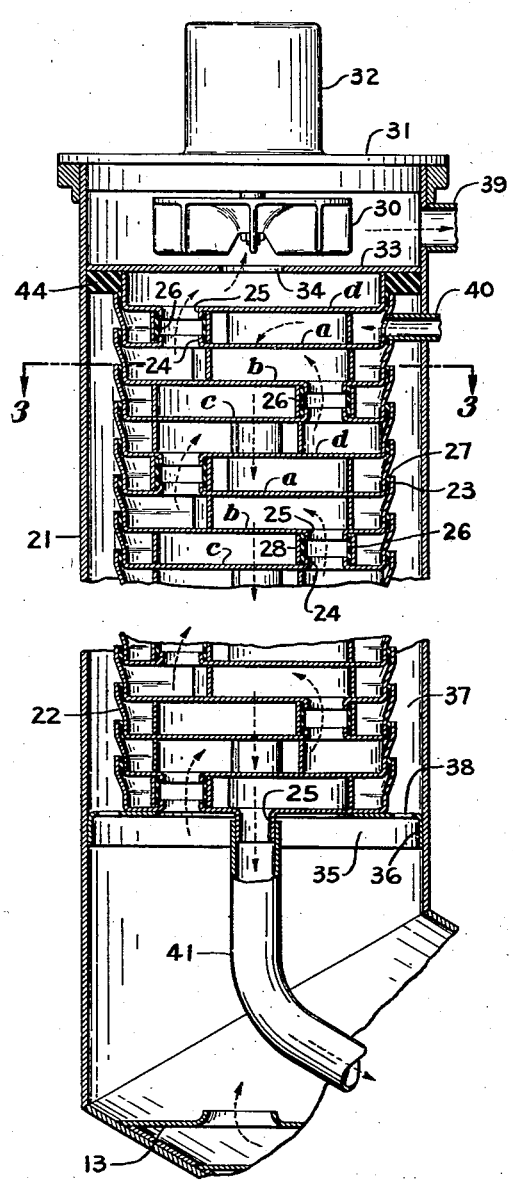
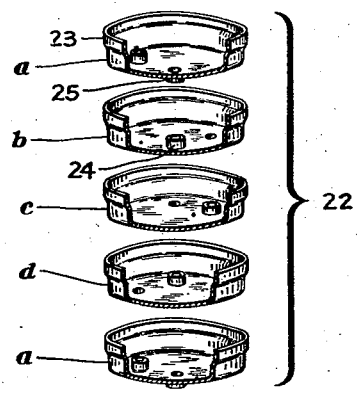
Fig. 4
Fig. 2
INVENTOR
*Arnold D. Siedle*
BY
*Harry S. Demarse*
ATTORNEY Patented Nov. 5, 1940

2,220,295

UNITED STATES PATENT OFFICE 2,220,295

CONTINUOUS ABSORPTION REFRIGERATION

Arnold D. Siedle, Canton, Ohio, assignor to The Hoover Company, North Canton, Ohio, a corporation of Ohio Application July 10, 1937, Serial No. 152,912

4 Claims. (Cl. 62—119.5)

This invention relates to a continuous absorption refrigerating system of the type in which an inert gas is employed and more particularly to means for circulating inert gas between the evaporator and absorber of such a system.

It is a principal object of the present invention to provide a combined absorber, gas heat exchanger and power unit assembly for continuous absorption refrigerating systems in which an inert gas is employed and in which the circulating unit is utilized to propel the inert gas through a circuit including the absorber, gas heat exchanger and evaporator. More specifically it is an object of the present invention to provide a simple compact absorber, gas heat exchanger and power unit assembly in which high efficiency of absorption and heat rejection may be achieved by means of a very simple unitary mechanism which is simple to fabricate and which lends itself readily to installation in a conventional domestic refrigerating cabinet.

It is one object of the present invention to provide power-driven means for circulating the inert gas in a continuous absorption refrigerating system and to provide an efficient gas heat exchanger adapted for use therewith.

It is a further object to provide an efficient gas heat exchanger for use in absorption refrigerating systems which will provide a large heat transfer surface and one which will be easy to fabricate and assemble.

It is another object of the invention to construct a gas heat exchanger in such fashion that heat will not be conducted along the length of the heat exchanger from one part thereof to another.

A further object of the invention is to provide a gas heat exchanger construction in which the heat transfer portions thereof are formed from thin sheet material of high heat conductivity.

It is a further object of the invention to construct a gas heat exchanger of a plurality of thin sheet metal stampings which are held together by frictional engagement.

It is a further object of the invention to provide a gas heat exchanger in which the walls of the gas passes are constructed of very thin material having a high heat conductivity and incapable of withstanding the system pressure but which are so placed in the system that they are subjected to substantially the same pressure at all points.

It is a further object of the invention to provide a gas heat exchanger in which both gas passes are formed in thin sheet metal elements incapable of withstanding the system pressure, but which are encased in a heavy metal container capable of withstanding the high pressure developed in continuous absorption refrigerating systems.

It is a further object of the invention to construct a gas heat exchanger of a plurality of interfitting sheet metal stampings of a novel construction.

Further objects reside in certain novel features of construction and arrangement of parts which will be apparent from the following description taken in connection with the accompanying drawings, in which:

Figure 2 is an enlarged vertical cross sectional view of a portion of a gas heat exchanger adapted for use in a refrigeration system of the character illustrated in Figure 1;

Figure 3 is a transverse cross sectional view of the gas heat exchanger of Figure 2, the view being taken on the line 3—3 thereof; and Figure 4 is a fragmentary perspective view of a number of plates in use in the heat exchanger of Figures 1 to 3; the view showing the cups in expanded relation.

Figure 1:
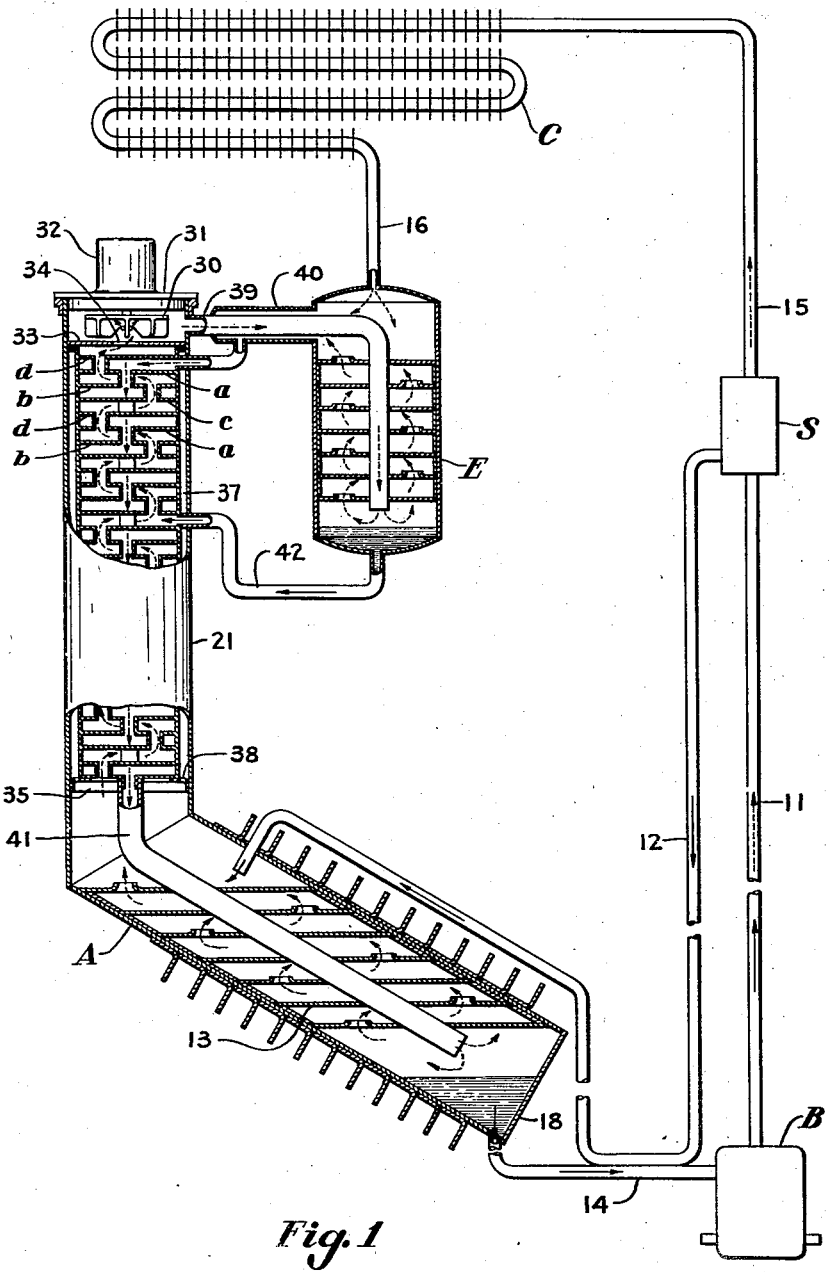
Figure 1 is a diagrammatic representation of a continuous absorption refrigerating system, various parts of the apparatus being shown in cross section to illustrate their internal construction and the fluid paths therethrough.

This application is a continuation in part of copending application Serial No. 26,594, filed June 14, 1935.

Referring to the drawings in detail and first to the diagram of Figure 1, it will be seen that a continuous absorption refrigerating system of the type in which inert gas is employed is illustrated as consisting of a boiler B, a vapor separation chamber S, a condenser C, an evaporator E, and an absorber A, connected by various conduits to complete the system. Thus, a conduit 11 connects the top of the boiler B to the vapor separation chamber S. This conduit may act as a vapor lift pump to convey liquid and vapor generated in the boiler B up into the vapor separation chamber S. From the vapor separation chamber S the liquid may flow into the absorber A through the conduit 12 and after flowing downwardly through the absorber over the baffle plates 13 therein flow back to the boiler B through the conduit 14, the conduits 12 and 14 being preferably in heat exchange relation as illustrated.

A conduit 15 connects the top of the vapor separation chamber S to the condenser C so that refrigerant vapor developed in the boiler B or in the vapor separation chamber S may be conveyed to the condenser, and after liquefying therein be conveyed into the evaporator E through the conduit 16.

The evaporator E may be of conventional construction, the arrangement illustrated consisting of a vertical tank closed at the top and bottom and provided with baffle plates therein.

One advantage of the present invention resides in the compact assembly of the absorber and gas heat exchanger. As disclosed in the copending application of Arnold D. Siedle, Serial No. 10,159, filed March 9, 1935, for Absorber for refrigerating systems, the advantages to be gained from placing the absorber in an inclined position are disclosed. The absorber used in the present invention may be like any one of those disclosed in the aforesaid co-pending case, the one here illustrated consisting of an inclined cylinder having elliptical shaped baffle plates 13 therein disposed horizontally, this vessel being closed at the bottom by an end plate 18 and being directly connected to the gas heat exchanger at its upper end.

The gas heat exchanger itself is shown diagrammatically in Figure 1 and is shown in detail in Figures 2, 3, and 4. It consists of a vertically disposed metal cylinder 21 capable of withstanding the pressure in the system and within which a number of cup members 22 are assembled. As best shown in Figure 4 the cups 22 are identical in shape and construction. Each has a slightly expanded rim 23 adapted to receive the lower portion of the cup immediately above it. The cup members 22 constitute the heat exchanger proper, and they are constructed of thin sheet metal material having a very high heat conductivity. Due to the fact that the cup members are constructed of thin sheet metal material having a high heat conductivity, they are readily formed by a drawing or stamping operation, provide good heat transfer between the various gas streams, are cheap to manufacture, and are readily held together by frictional engagement.

In the bottom of each cup 22 two nipples are struck, one pointing upwardly as illustrated at 24 and the other downwardly, as illustrated at 25. These nipples are of the same length and are spaced equal distances from the centers of the bottoms of the cups. When a cup 22 is viewed from above, the nipple 24 appears spaced 90° to the right of the nipple 25.

If the succeeding cups are rotated 90° successively one below the other as illustrated at a, b, c and d of Figure 4, the downwardly extending nipple 25 on one cup will be disposed in juxtaposition to the upwardly extending nipple 24 on the cup immediately beneath it. It will thus be seen that although all of the cups 22 are identical two paths or circuits for gas to flow therethrough may be provided, if the nipples 24 are connected to the nipples 25.

The assembly of the cups 22 and connections is best illustrated in Figure 2. As there shown, each downwardly extending nipple 25 is connected to the upwardly extending nipple 24 on the cup immediately beneath it by means of a rubber sleeve 26. The rubber sleeves 26 make the assembly gas tight, provided no great pressure difference exists between the two gas streams in the heat exchanger. They also act as insulators to prevent the transmission of heat from the warm end to the cold end of the heat exchanger assembly. To seal the cups from each other and to provide additional insulation, rubber rings 27 are also provided, these being placed between the expanded rim 23 of each cup and the lower portion of the next cup above it which is nested into this rim.

The rubber strips 26 and 27 provide a structure which is gas-tight even though considerable variation may occur between the different cup elements. However, a more compact and economical structure can be made by eliminating the rubber strip 27 and by replacing the rubber strip 26 with metal collars. In such a structure the expanded rim 23 of each cup will nest snugly with the bottom portion of the superposed cup and the nipples 24 and 25 will nest snugly in metallic collars similar to rubber collars 26. An all metal structure of this character is sufficiently gas-tight for its intended purpose due to the face that the pressure differential existing between the various gas paths is relatively small. Of course in an all metal structure greater accuracy would be required in making the stampings. An all metal structure has substantially the same insulating properties as the metal and rubber structure illustrated in Figure 2 due to the fact that even an extremely tight mechanical joint, such as a gas-tight joint, does not provide a good thermal joint; hence, there will be no appreciable heat flow lengthwise of the heat exchanger in an all metal structure.

As best shown in Figures 2 and 3, a thin strip of metal 28 may be disposed in each cup 22, each strip being bent around one nipple 24 and extending around, somewhat concentrically with, and spaced inwardly from the rim of the cup for slightly over 270° from the nipple 24 where it engages the outer wall of the cup. This strip provides means for directing the flow of gases from the entrance to the cup around the outer surface thereof before passing through the exit in the cup. For clarity in illustrating, these strips 28 are not shown in Figures 1 and 4.

As diagrammatically illustrated in Figure 1, and as will be apparent from the study of the illustration in Figure 2, it will be seen that alternate cups have the same gas stream therein. In order to explain the flow of the gases the cups 22 have been designated with the letters a, b, c and d according to their locations. The space between the cups a and b is connected to the space between the cups c and d by the downwardly extending nipple 25 on the cup b and the upwardly extending nipple 24 on the cup c, these nipples being at the right of the heat exchanger as illustrated on the drawings. Likewise the space between the cups b and c is connected to the space between the cups d and a by the downwardly extending nipple 25 on the cup c and the upwardly extending nipple 24 on the cup d, these two nipples being at the rear of the heat exchanger as viewed in the drawings.

Likewise the space between the cups c and d is connected to the space between the cups a and b by the downwardly extending nipple 25 on the cup d and the upwardly extending nipple 24 on the cup a, these two nipples being on the left side of the heat exchanger as viewed in the drawings.

Likewise, the space between the cups d and a is connected to the space between the cups b and c by the nipple 25 on cup a, and the nipple 24 on cup b, these nipples being at the front of the heat exchanger as viewed in the drawings.

Thus, one stream of gas may flow upwardly through the gas heat exchanger, passing from the space between the cups a and b to the left, then upwardly into the space between the cups c and d, across this space to the right and upwardly into the space between the cups a and b and to the left again, this flow being back and forth across the plane of the paper (Figures 1 and 2) insofar as the inlet and outlet to each space is concerned, it being understood that the strip 28 in all cases causes the gas to flow around the outside of the gas heat exchanger in passing from the entrance to the exit of the space between any two cups.

Likewise a second stream of gas may pass downwardly through the gas heat exchanger from the space between cups d and a in front of the plane of the paper (Figure 2) then rearwardly between the cups b and c and downwardly behind the plane of the paper into the space between the cups d and a where it comes forward again, this flow also being directed by baffle plates 28.

The heat exchanger is mounted in the casing 21 between a head plate 33 provided with an opening 34 and a bottom supporting structure generally indicated at 35. The bottom plate 35 is provided with a downwardly turned annular portion 36 which tightly fits the inner wall of the casing 21 and is secured thereto in any suitable manner, as by tack welding. It will be noted that the heat exchanger structure is appreciably spaced from the inner wall of the supporting casing 21 forming a space 37 between the outer wall of the heat exchanger and the inner wall of casing 21. The space 37 functions as a pressure equalizing and insulating chamber, it being in communication with the refrigerating system through restricted openings 38 formed in supporting plate structures 35. By reason of this construction the pressure on opposite sides of the heat exchanger cup elements is equalized whereby these cups, which are of very thin material, are subjected only to the slight pressure difference existing between the different passes of the gas heat exchanger. The total pressure existing within the shell 21 is very great and may go higher than twenty atmospheres yet the heat exchange walls of the apparatus need only to be able to withstand a pressure difference of an extremely small amount.

The path for the flow of gases through the heat exchanger is so long that the flow therethrough would be extremely slow unless induced by some means other than gravity. Accordingly, a centrifugal fan is connected into the inert gas circuit. This fan might be mounted upon the absorber as in the arrangements in the co-pending application Serial No. 10,159 referred to above, but it is preferably mounted, as shown at 30, above the stack of cups in the top of the gas heat exchanger assembly.

The fan 30 may be mounted upon a shaft supported by suitable bearings in the end piece 31 at the top of the gas heat exchange and be driven by an electric motor of any suitable type as indicated at 32, this motor being preferably hermetically sealed to the gas heat exchanger, either with the rotor inside and the field outside of the sealing means, or with the entire motor within the casing or entirely encased.

The opening 34 in the plate 33 forms the eye of the centrifugal fan 30. The fan 30 may discharge into a conduit 39 which passes from the periphery of the fan chamber into the evaporator E and preferably is connected to the lower portion thereof.

The plate 33 and the top cup, which is not formed with an expanded rim, are sealed by a rubber gasket 44.

For providing a return pass for the flow of gas from the evaporator to the gas heat exchanger, a conduit 40 is connected to the top thereof and to the space just above the upper cup 22 therein.

As illustrated in Figure 1 the lower end of the gas heat exchanger may be welded, at an angle, to the inclined absorber A and the lower cup 22 may have its depending nipple 25 connected to a conduit 41 which extends through the baffle plates 13 in the absorber so as to convey the inert gas to the lower end thereof.

As shown in Figure 1, gas propelled by the fan 30 thus flows through the conduit 39, upwardly through the evaporator E, through the conduit 40, downwardly through the gas heat exchanger as explained above, through the conduit 41 into the bottom of the absorber, thence upwardly through the absorber across the baffle plates 13, and from there upwardly through the gas heat exchanger in the manner explained above, back to the fan 30.

The assembly of the absorber and gas heat exchanger is such that it may be readily mounted along the back and bottom portion of a refrigerator cabinet. The heat exchanger may be wholly or partly covered with insulation or be mounted in the wall of the cabinet so as to occupy a minimum of space.

A conduit 42 may be connected to the bottom of the evaporator and to any suitable point in the gas heat exchanger or to the absorber to provide means for draining the evaporator of any liquid which may not evaporate therein.

From the above description it will be seen that I have provided a gas heat exchanger in which the heat exchanger proper consists of a plurality of relatively thin light weight sheet metal stampings having high conductivity which are placed in a heat exchanger system which operates under very high pressure and which is so constructed that the pressure differences on opposite sides of the small heat exchanger element is very small. It will also be seen that with the apparatus just described the inert gases in a refrigerating system are forced to pass through a very long and tortuous path in heat exchange relation but without any appreciable heat transfer lengthwise of the heat exchanger between the different elements thereof.

It will be obvious from the description above that the inner elements of the heat exchanger may be assembled and tested outside the shell 21 and then inserted therein in assembled relation. This greatly facilitates manufacture and assembly of the heat exchanger.

While only one embodiment of the invention has been shown and described herein, it is obvious that the invention may be embodied in other constructional forms. Other forms of connectors may be substituted for the rubber sleeves 26 and the rubber rings 27 may be dispensed with. If the nipples 24 are made slightly longer and larger than those shown in the drawings, the nipples 25 may be pressed into them with an airtight fit, as the lower portions of the cups 22 are pressed into the expanded rims 23. Various other changes may be made in the construction without departing from the spirit of the invention or the scope of the annexed claims.

I claim:

1. In a continuous absorption refrigerating system, using an inert gas, the combination of an evaporator, an absorber, a gas heat exchanger having a plurality of heat transfer paths and power-driven means for causing the inert gas to circulate from the evaporator through one of the heat transfer paths of the gas heat exchanger, the absorber, through another one of the heat transfer paths of the gas heat exchanger and back to the evaporator, said gas heat exchanger consisting of a vertically disposed vessel having means for causing gas flow therein set up by said power-driven means to have a tortuous path, said absorber consisting of an inclined vessel having means for retaining liquid therein, and the lower end of said gas heat exchanger being secured directly to said absorber.

2. A combined absorber and heat exchanger comprising an elongated air-cooled vessel forming an absorption chamber in the lower portion and a gas heat exchanger in the upper portion thereof, said absorption chamber including means for passing a gas conveying an absorbable in counterflow to and in intimate contact with absorption fluid, and said heat exchanger including a plurality of nested members of thin material having high heat conductivity and supported in the vessel directly above the absorption chamber, said members being so interconnected that gas conveying an absorbable can flow through certain thereof, to said absorption chamber and back through others thereof whereby heat may be transferred from one gas stream to the other.

3. A combined absorber and heat exchanger comprising an elongated vessel forming an absorption chamber in the lower portion, and a gas heat exchanger in the upper portion thereof, said absorption chamber including means for passing a gas conveying an absorbable in counterflow to and in intimate contact with absorption fluid, said heat exchanger including a plurality of nested members of thin material of high heat conductivity and supported in the vessel directly above the absorption chamber, said members being so interconnected that gas conveying an absorbable can flow through certain thereof to said absorption chamber and back through others thereof whereby heat may be transferred from one gas stream to the other, and means mounted in said vessel operable to forcibly circulate the gases through the absorber and the heat exchanger.

4. An absorber for use in an absorption refrigeration apparatus comprising a casing sufficiently strong to withstand the internal pressure of a refrigeration system, means in one portion thereof for bringing a medium conveying a refrigerant in gaseous phase into intimate contact with an absorption fluid for said refrigerant, and a gas heat exchange means of insufficient strength to withstand said internal pressure, said means being submerged in a substantially static body of said medium, the arrangement being such that heat is exchanged between a stream of relatively pure medium leaving the absorber and a stream of the refrigerant laden medium entering the absorber.

ARNOLD D. SIEDLE.